(12) United States Patent
Rodriguez et al.

(10) Patent No.: US 11,203,211 B2
(45) Date of Patent: Dec. 21, 2021

(54) SYSTEM AND METHOD FOR COATING A LENS

(71) Applicant: Transitions Optical, Ltd., Tuam (IE)

(72) Inventors: Carlos Rodriguez, Clearwater, FL (US); William D. Carpenter, Pinellas Park, FL (US)

(73) Assignee: Transitions Optical, Ltd., Tuam (IE)

( * ) Notice: Subject to any disclaimer, the term of this patent is extended or adjusted under 35 U.S.C. 154(b) by 0 days.

(21) Appl. No.: 16/603,928

(22) PCT Filed: Apr. 28, 2017

(86) PCT No.: PCT/EP2017/060233
§ 371 (c)(1),
(2) Date: Oct. 9, 2019

(87) PCT Pub. No.: WO2018/197003
PCT Pub. Date: Nov. 1, 2018

(65) Prior Publication Data
US 2020/0122487 A1    Apr. 23, 2020

(51) Int. Cl.
*B41J 3/54* (2006.01)
*B41J 3/407* (2006.01)
*B41J 11/00* (2006.01)
*B41M 3/00* (2006.01)

(52) U.S. Cl.
CPC ............... *B41J 3/543* (2013.01); *B41J 3/407* (2013.01); *B41J 11/008* (2013.01); *B41J 11/009* (2013.01); *B41M 3/003* (2013.01)

(58) Field of Classification Search
CPC ......... B41J 3/407; B41J 3/4073; B41M 3/003
See application file for complete search history.

(56) References Cited

U.S. PATENT DOCUMENTS

| | | | |
|---|---|---|---|
| 6,315,410 B1 | 11/2001 | Doshi | |
| 6,902,274 B2 | 6/2005 | Tucker | |
| 2002/0182316 A1 | 12/2002 | Gilliard et al. | |
| 2005/0072959 A1 | 4/2005 | Moia et al. | |
| 2008/0078037 A1* | 4/2008 | Inuzuka | B29D 11/00903 8/470 |
| 2008/0167183 A1* | 7/2008 | Hoekstra | B41M 5/46 503/201 |
| 2010/0166978 A1 | 7/2010 | Nieminen | |

(Continued)

FOREIGN PATENT DOCUMENTS

| | | |
|---|---|---|
| EP | 3115215 A1 | 11/2017 |
| WO | 2012037640 A1 | 3/2012 |

*Primary Examiner* — Julian D Huffman
(74) *Attorney, Agent, or Firm* — The Webb Law Firm

(57) ABSTRACT

A system and method for coating a lens (10) using a plurality of inkjet print bars (46) arranged in-line, includes generating, using at least one processor (54, 110) in communication with the plurality of inkjet print bars (46), at least one graphical user interface configured to facilitate the automation of the creation or selection of an image to be printed on a lens (10); generating a plurality of image layers based on the lens (10) geometry, target product, and number of print bars (46); and controlling, using the at least one processor (54, 110), at least two of the plurality of inkjet print bars (46) to print the image on the lens (10), such that each of the at least two inkjet print bars (46) prints at least one image layer of the plurality of image layers.

15 Claims, 13 Drawing Sheets

(56) References Cited

U.S. PATENT DOCUMENTS

| | | | |
|---|---|---|---|
| 2013/0000499 A1* | 1/2013 | Ookubo | B41M 5/0064 |
| | | | 101/35 |
| 2013/0197932 A1 | 8/2013 | Herman et al. | |
| 2015/0061166 A1* | 3/2015 | Van De Vrie | A61B 3/111 |
| | | | 264/1.7 |
| 2018/0050549 A1* | 2/2018 | Frease | B29D 11/00653 |
| 2019/0308434 A1* | 10/2019 | Maurice | B41M 3/003 |
| 2019/0310492 A1* | 10/2019 | Gromotka | B44C 1/00 |

* cited by examiner

SYSTEM AND METHOD FOR COATING A LENS

CROSS-REFERENCE TO RELATED APPLICATION

This application is the United States national phase of International Application No. PCT/EP2017/060233 filed Apr. 28, 2017, the disclosure of which is hereby incorporated by reference in its entirety.

BACKGROUND OF THE INVENTION

Field of the Invention

The invention generally relates to a system and method for coating a lens and, more specifically, to a system and method for coating a lens using a plurality of inkjet printers.

Description of Related Art

Using inkjet printing to apply coatings to lenses, such as optical lenses, presents several unique challenges. For example, it is often desirable to quickly and efficiently coat a large number of lenses, with some of the lenses requiring different coating parameters than other of the lenses.

Presently, images may be created and ripped from a network or database using a commercially available software package, such as Photoshop, Adobe Illustrator, or Ergosoft. A separate program may then be used to setup the printer temperatures and/or pressures prior to printing the product. Normally the printer setup process is manually done, and completely separate from image production.

Due to the high number of possible lens geometries and inkjet process variables, the set-up for printing each type of a large number of lenses may be particularly cumbersome and not conducive to mass production.

Accordingly, there is a need in the art for improved systems and methods for coating lenses using inkjet printing technology.

SUMMARY OF THE INVENTION

In view of the foregoing issues, it is an object of the invention to provide a system and/or method and/or apparatus for coating a lens using a plurality of ink jet print bars arranged in-line. The invention may integrate one or more of the tasks of image creation/ripping, configuring the print bars based on various lens geometries (e.g., diameter and base curves combinations) and inkjet process variables (e.g., frequency, throw distance, temperature and pressure), and may provide for the rapid coating of large number of lenses having varying geometries.

A system for coating a lens using a plurality of inkjet print bars comprises: a plurality of inkjet print bars arranged in-line; at least one processor in communication with the plurality of inkjet print bars; a computer-readable medium including program instructions that, when executed by the at least one processor, cause the at least one processor to: generate at least one graphical user interface configured to facilitate the automation of the creation or selection of an image to be printed on a lens; generate a plurality of image layers based on the lens geometry, target product, and number of print bars; and control at least two inkjet print bars of the plurality of inkjet print bars to print the image on the lens, such that each of the at least two inkjet print bars prints at least one image layer of the plurality of image layers.

A method for coating a lens using a plurality of inkjet print bars arranged in-line comprises: generating, using at least one processor in communication with the plurality of inkjet print bars, at least one graphical user interface configured to facilitate the automation of the creation or selection of an image to be printed on a lens; generating a plurality of image layers based on the lens geometry, target product, and number of print bars; and controlling, using the at least one processor, at least two of the plurality of inkjet print bars to print the image on the lens, such that each of the at least two inkjet print bars prints at least one image layer of the plurality of image layers.

BRIEF DESCRIPTION OF THE DRAWING(S)

Figure 1:
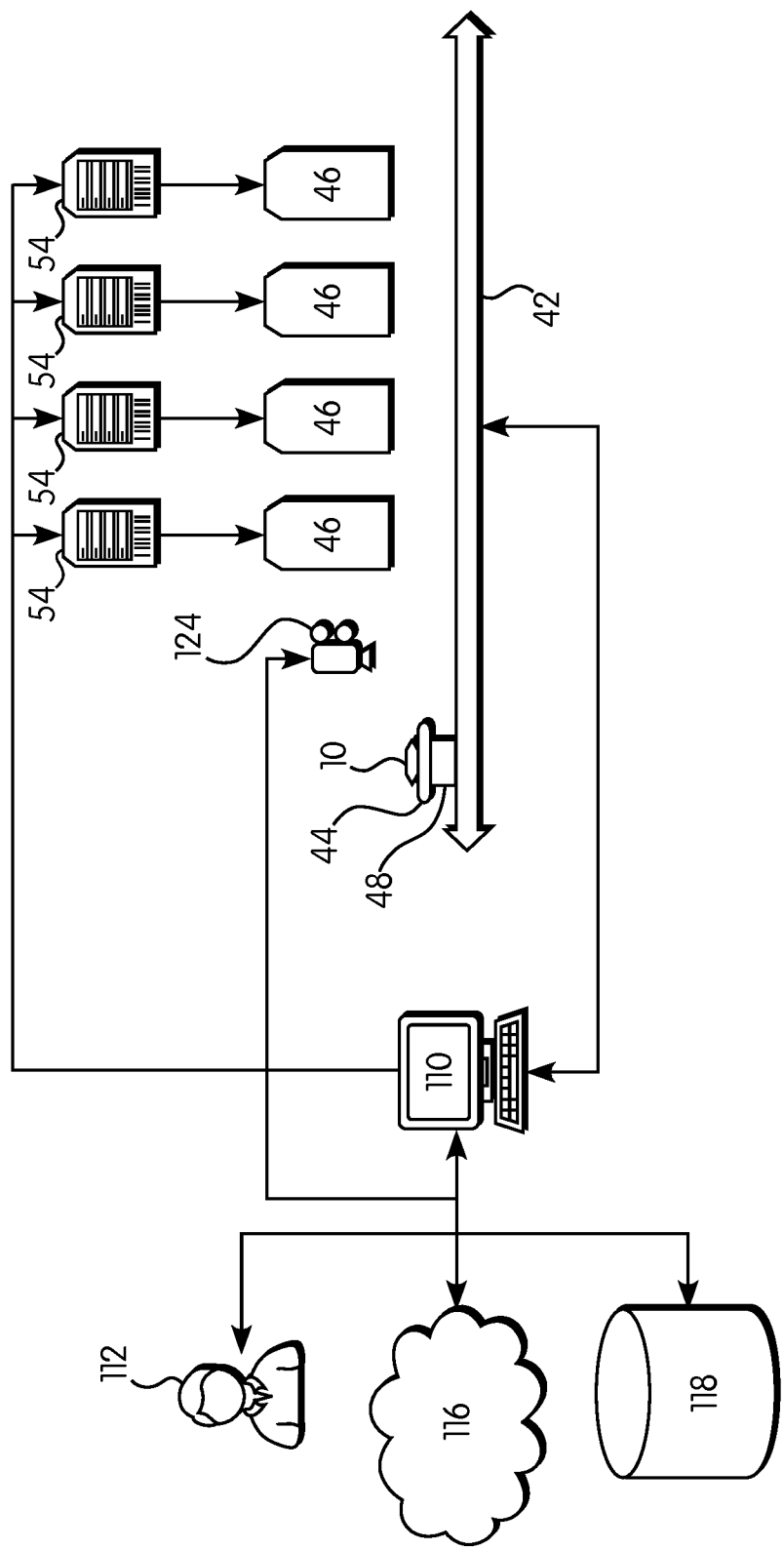
FIG. 1 is an exemplary system diagram illustrating the invention.

FIGS. 5A-J show various iterations of a graphical user interface in accordance with the invention.

DESCRIPTION OF THE INVENTION

The features and characteristics of the invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

As used in the specification and the claims, the singular form of "a", "an", and "the" include plural referents unless the context clearly dictates otherwise.

For purposes of the description herein, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary configurations of the invention. Hence, specific dimensions and other physical characteristics related to the configurations disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if one or more intermediary units processes data from one unit and transmits processed data to the second unit. It will be appreciated that numerous other arrangements are possible.

As used herein the term "optical" means pertaining to or associated with light and/or vision. For example, an optical element, article or device can be chosen from ophthalmic elements, articles, and devices, display elements, articles, and devices, windows, and mirrors.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "lens" means lenses, partially formed lenses, and lens blanks.

As used herein the term "display" means the visible or machine-readable representation of information in words, numbers, symbols, designs or drawings. Non-limiting examples of display elements, articles and devices include screens, and monitors.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, the term "print bar" refers to a controllable discharge apparatus comprising one or more nozzles for applying a coating material on a printing surface. For example, each "print bar" of a printing apparatus may be a single print head, or may be a plurality of print heads arranged in close proximity to each other and which are configured to be controlled as a unit. A "print bar" may be an elongate print head or a plurality of print heads arranges in a line, in order to allow for printing on larger substrates (e.g., a lens) without laterally moving the substrate or the print head. However, as used herein, the term "print bar" is understood to encompass a single print head, or a plurality of print heads acting as a unit, regardless of the overall size or shape thereof.

In various aspects of the disclosure, a plurality of print bars may be arranged in-line. As used herein, the phrase "arranged in line" indicates that each element that is so arranged forms an integral part of a sequence of operations or machines. In various non-limiting aspects, a plurality of print bars may be arranged along a substantially linear conveyance mechanism, such that each print bar may operate on the lens in sequence as the lens is moved along the conveyance mechanism. However, a plurality of print bars arranged along a curved, serpentine, circular, or otherwise-shaped conveyance mechanism would also be considered to be arranged in line, so long as each print bar is capable of operating on the lens in sequence. Additionally, in various non-limiting aspects, a plurality of print bars may still be considered to be arranged in-line even if there are intervening structures which may perform intermittent processing steps or otherwise act upon the lens in between print bars, and regardless of whether the lens is moved relative to the print bars and/or the print bars are moved relative to the lens.

FIG. 1 is an exemplary system diagram illustrating aspects of the invention. In the illustrated example, a plurality of print bars 46 are arranged in-line over a lens conveyance mechanism 42. Each print bar 46 is in communication with a controller 54. Each controller 54 is in communication with a main computer 110, which may generate a graphical user interface configured to facilitate the automation of the creation or selection of an image, for example, comprising a plurality of image layers, to be printed on a lens 10. A camera 124 or other sensor may also be in communication with the main computer 110. The camera 124 may be arranged along the lens conveyance mechanism 42 prior to the plurality of print bars 46 (with respect to a direction of movement of the lens conveyance mechanism 42) such that it may provide information regarding the lens 10 to the main computer 110 prior to printing, so that various printing parameters may be adjusted.

With continued reference to FIG. 1, the lens 10 may be arranged on a workpiece holder 44 which is affixed to a movable base 48 which may be movable in one or more directions via the lens conveyance mechanism 42.

The plurality of print bars 46 may be arranged in-line and may be used to apply one or more layers of coating onto a surface of the lens 10. The coating material may be applied in the form of fine droplets on a printing surface, such as one or more surfaces of the lens 10. This may be accomplished via a discharge apparatus associated with the printing apparatus, such as one or more print bars 46, each comprising a plurality of adjacent, commonly controlled print heads having one or more nozzles associated therewith.

Each of the nozzles may be configured to controllably discharge a single droplet of the coating material in accordance with commands received from a controller which has been provided with a pre-determined droplet discharge profile. For example, the controller may control the size of the drop (volume of coating material) and the speed at which the drop is formed and delivered.

One or more print bars 46 may be provided with one or more piezoelectric elements that provide a mechanism for forming and discharging the droplets from the one or more print bars 46. A voltage applied to the one or more piezoelectric elements, such as a control voltage determined by the controller, changes the shape of the one or more piezoelectric elements, thereby generating a pressure pulse in the coating material, which forces a droplet of the coating material from the nozzle.

One or more print bars 46 may have at least one chamber including a heater. A droplet is ejected from the chamber when a pulse of voltage is passed across the heater, such as a control voltage determined by the controller. Such a voltage differential causes a rapid vaporization of the coating material in the chamber and forms a bubble. Formation of the bubble causes a pressure differential within the chamber, thereby propelling a droplet of the coating material onto the coating surface. The controller directs one or more print bars 46 to generate droplets on demand. In this manner, the timing, position, and volume of coating material delivered per unit of area of the printing surface can be controlled.

Each droplet discharged from the nozzle of the print bar 46 is deposited on the printing surface in the form of a single dot. Thus, assembly of deposited droplets creates an array that enables a pattern to be formed. In this manner, all or portions of the printing surface may be coated. When one or more portions of the printing surface are printed, various designs, such as characters, numbers, images, or the like, may be formed on the printing surface. When the entire printing surface is printed, the assembly of deposited droplets forms a layer of the coating composition on the printing surface, such as a surface of the lens 10.

Each print bar 46 may be associated with one or more storage reservoirs 50 (shown in FIG. 2) which may contain coating material for application via the respective print bar 46. One or more storage reservoirs 50 may be internal to the respective print bar 46 or may be external thereto and in fluid communication therewith. Further, storage reservoirs 50 may be shared among print bars 46 or a plurality of storage reservoirs 50 may be associated with each print bar 46. Various other arrangements which would occur to one skilled in the art are possible in accordance with the invention.

The lens conveyance mechanism 42 may take a variety of forms and may be unidirectional, bidirectional, or may provide multiple degrees of freedom. The lens conveyance mechanism 42 can, for example, take the form of a conveyor belt, a ball screw mechanism, or any other mechanical device or assembly capable of moving the lens 10 along the plurality of print bars 46. Further, the lens conveyance mechanism 42 may be manually controlled or powered by one or more motors. The lens conveyance mechanism 42 may be configured to move the lens 10 under one or more of the print bars 46.

It should be noted that it is also within the scope of the invention to move the one or more of the print bars 46 relative to the lens 10, or move both of the lens 10 and the one or more of the print bars 46 relative to each other. However, it is generally preferred to move the lens 10 and to leave the one or more print bars 46 stationary during operation because the print bars 46 are generally larger and/or heavier than the lens 10 and appropriate holding device 44 and because moving of the print bars 46 which comprise one or more inkjet printers may cause undesirable sloshing of liquid contained therein.

With continued reference to FIG. 1, one or more images may be created by a user 112 using an interface in communication with the main computer 110, or one or more images may be downloaded from a database 118 or network 116. An image may be split into multiple layers. Multiple images may be created or selected such that each image forms one layer, or any combination thereof.

Each print bar 46 may be configured to print as many layers as desired of the final image to be printed on the lens 10. Each print bar 46 may print a single layer. Or, particularly for more complex images or images having more than one layer which uses the same coating material, the system can be configured to allow for multiple passes such that a given print bar 46 may print more than one layer on the lens 10. All of the print bars 46 may be used to print an image. Or, a subset of available print bars 46 may be utilized for a given printing application, such that the system may be used to print simpler images or images which do not require the particular coating material utilized by one or more of the print bars 46.

Each print bar 46 may be independently configurable via the main computer 110 and its respective controller 54 to allow the user increased customization options. Further, various aspects of each print bar 46 may be configured separately, either manually or via one or more separate electronic control systems.

Figure 4:
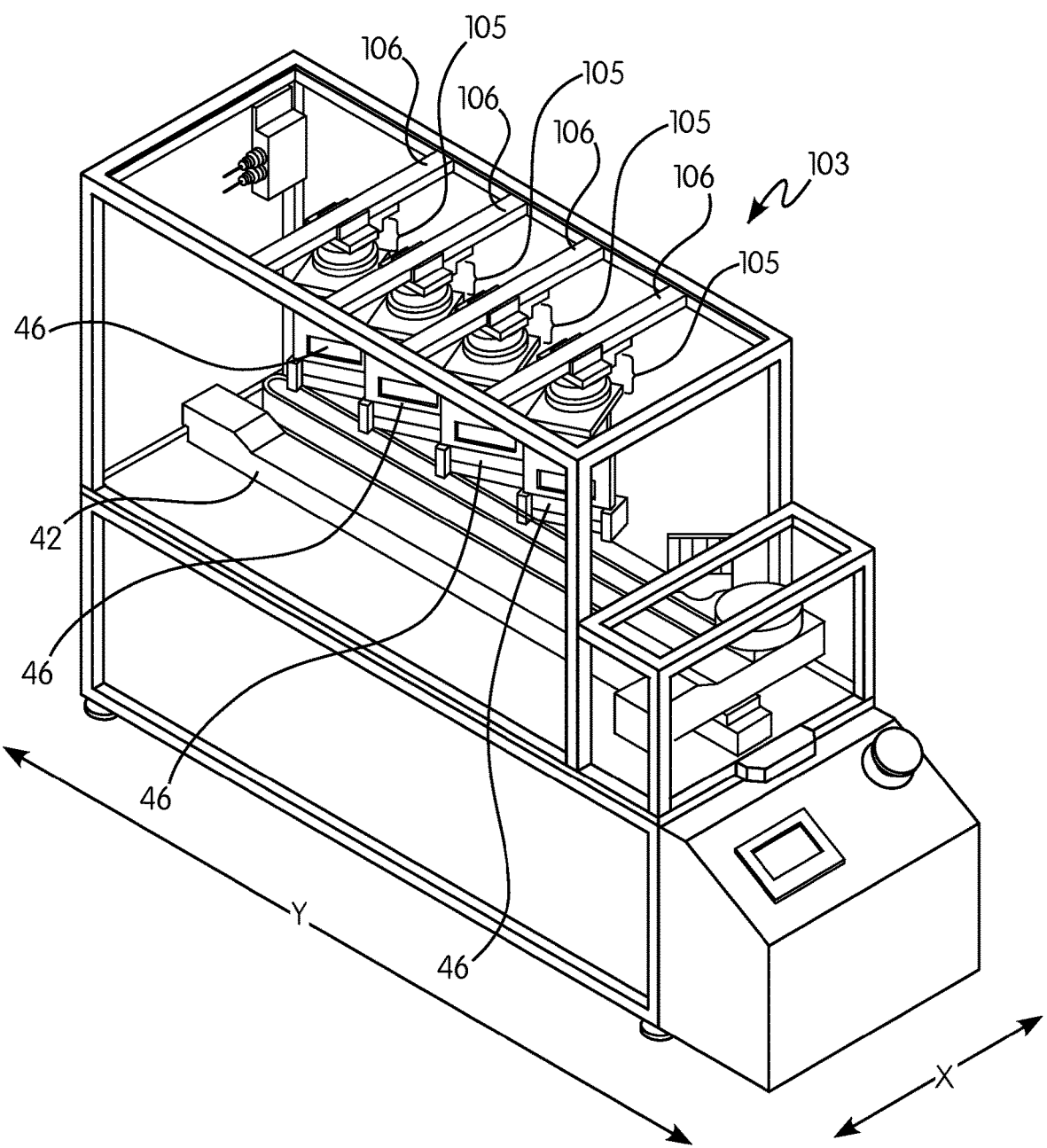
FIG. 4 is a perspective view of the exemplary printing apparatus shown in FIG. 3.

Referring now to FIG. 4, the plurality of print bars 46 may be suspended from support members 106. The support members 106 may be affixed to an upper portion of an enclosure 103. In the illustrated example, each print bar 46 is attached to its respective support member 106 via a rotatable mounting bracket 105.

Each support member 106 may be adjustable along the longitudinal axis Y of the enclosure 103 and each mounting bracket 105 may be adjustable along its respective support member 106 along the transverse axis X of the enclosure 103. Further, each print bar 46 may be rotatably and/or pivotably adjustable about its respective mounting bracket 105. As such, the rotational angle of each print bar 46 relative to the substrate, or "saber angle", may be adjusted prior to printing. Such adjustment may be accomplished via electronically controlled motors or, in simpler configurations, may be accomplished manually using various hardware arrangements known to those skilled in the art. Such adjustments may be detectable by the main computer 110 via the controllers 54 and/or various sensors in communication with the system, and may be used to adjust various printing parameters.

Referring back to FIG. 1, the system may further be adapted to adjust various parameters of the image to be printed based on specific product data for and/or measurements of the lens 10. Such data may be entered by the user 112, obtained from a network 116 or database 118, obtained using a camera 124 or other sensor in communication with the system, or any one or combination thereof.

The user 112 may enter or select a product identification code and the main computer 110 may then adjust various predetermined printing parameters which may be stored internally and/or obtained from a network 116 or database 118. Additionally or alternatively, the camera or other sensor 124 may observe an identifying mark on the lens 10 and/or measure a characteristic of the particular lens 10 which may be associated with a product identity, and communicate this information to the main computer 110, which may then adjust various predetermined printing parameters for the determined product identity, which may be stored internally and/or obtained from a network 116 or database 118.

Additionally or alternatively, the camera or other sensor 124 may acquire and analyze visual, tactile, and/or other data to be processed by the main computer 110 which may, automatically, in response to user commands, or any combination thereof, make adjustments to various printing parameters based on this data. Examples of sensors which may produce tactile data include CCD (charge-coupled device) and CMOS (complementary metal-oxide semiconductor) sensors. Such visual, tactile, or other data may include lens diameter, lens curvature, lens thickness, lens material, or any combination thereof. In various examples, such data may include a reading of a 2D data matrix, barcode, Quick Response Code, or other identifying image which may be in various examples marked on or etched into the surface of the lens and which may contain information about or be used to look up information about the lens itself. The main computer 110 and/or one or more of the controllers 54 may be configured to automatically adjust the dots-per-inch "DPI" of the coating material to be applied by the various print bars 46 based on lens curvature in order to ensure a uniform coating is applied to the lens 10. Such features may be used in combination. For example, a user 112 may enter a product classification which designates certain parameters of the lens 10 with a high degree of generality. The camera or other sensor 124 may visually identify a marking or characteristic measurement of the lens to identify a subclass of product which includes more specific parameters. Further, the camera or other sensor 124 may communicate visual, tactile, or other data regarding the lens 10 which may be communicated to and analyzed by the main computer 110. Corresponding data such as lens measurements may be displayed on a user interface such that a user 112 may make further adjustments to the image or images to be printed and/or various printing parameters based on this data.

Figure 2:
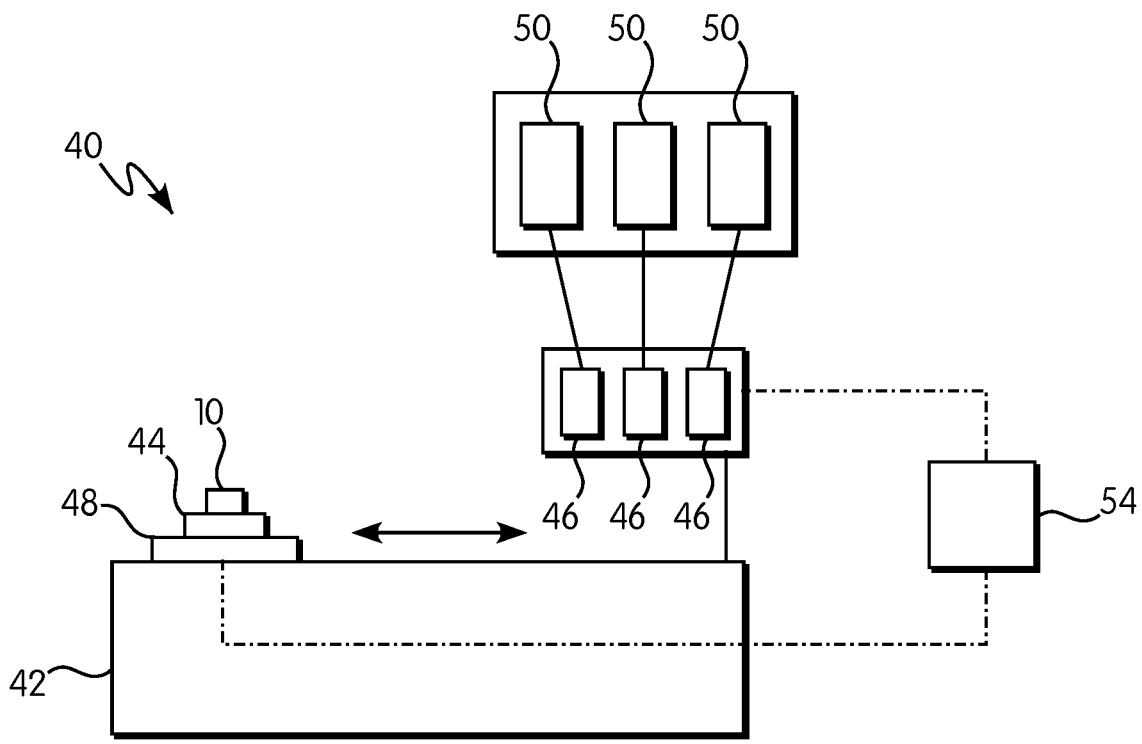
FIG. 2 is a side view of an exemplary printer arrangement in accordance with the invention.

FIG. 2 is a representative schematic side view of a printing apparatus including a plurality of print bars 46 arranged in-line. In the illustrated example, the printing apparatus 40 includes a housing 42 having a workpiece holder 44 and one or more print bars 46. The workpiece holder 44 may be configured to securely retain a lens 10 during the printing operation. The workpiece holder 44 may be configured to retain a frame, such as an eyeglass frame, having the lens 10 mounted therein. The workpiece holder 44 may be attached to a movable base 48 that moves the workpiece holder 44, along with the lens 10 secured thereto, relative to the one or more print bars 46. The movable base 48 may be movable in a linear direction in one, two, or three axes. Additionally, or in the alternative, the movable base 48 may be rotatable about one, two, or three axes.

In this manner, the movable base 48 may have six degrees of freedom to move the workpiece holder 44 relative to the one or more print bars 46 in order to position the lens 10 in a predetermined position relative to the print bars 46. The movable base 48 may be moved manually, or its movement may be controlled by one or more motors. The workpiece holder 44 may be stationary, while the one or more print bars 46 are provided with a movable base 48 to move the one or more print bars 46 relative to the workpiece holder 44. Each print bar 46 may be movable independently of any other print bar 46.

Similar to the workpiece holder 44, the one or more print bars 46 may be movable in up to six directions (translation along three axes and rotation about three axes). Both the workpiece holder 44 and the one or more print bars 46 may be movable on a movable base 48. Prior to coating, a lens 10 may be loaded into the workpiece holder 44 prior to coating the surface of the lens 10 using the plurality of print bars 46. The coated lens 10 may then be removed from the workpiece holder 46 to allow a subsequent, pre-coated lens 10 to be loaded. A plurality of workpiece holders 46 (not shown) may be provided on a continuously moving movable base 48 such that a plurality of lenses 10 may be coated in a continuous process.

Each print bar 46 is in fluid communication with at least one storage reservoir 50. Individual storage reservoirs 50 may optionally be provided for each print bar 46. Each storage reservoir 50 is configured to store a coating material 52 to be delivered to the one or more print bars 46. In this manner, it is possible to print a plurality of different coating materials at the same time by using a plurality of print bars 46 to generate various coatings and colors. Thus, various coating layers may be formed as a mixture of two or more coating compositions. A first coating layer 22 and/or one or more additional coating layers may be formed from a single coating composition applied in one or more successive layers. Various additional devices, such as heaters, mixers, or the like, may be associated with each storage reservoir 50 for preparing the coating material prior to delivery to the one or more print bars 46. The viscosity of the coating material may be controlled, such as by increasing or reducing the viscosity of the coating material, prior to loading the coating material into the storage reservoir 50. Heating of the coating material within a print bar manifold or reservoir also may be used to control coating viscosity prior to delivering the coating material to the lens 10.

Figure 3:
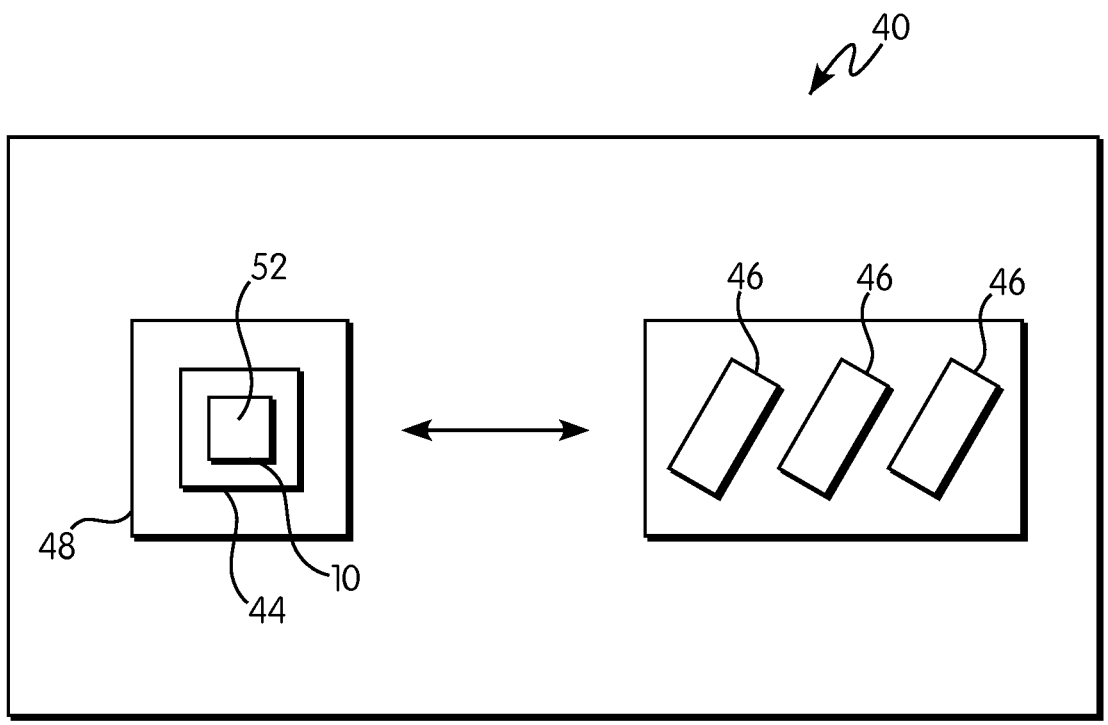
FIG. 3 is a plan view of an exemplary printing apparatus of the invention including a plurality of print bars arranged in-line.

FIG. 4 is a representative perspective view of the printing apparatus shown in FIG. 3. With reference to FIG. 4, a plurality of print bars 46 may be arranged in an array. The plurality of print bars 46 may be arranged parallel to one another in a direction that is angled relative to a direction in which the optical lens 10 is moved relative to the print bars 46. Offsetting the print bars 46 at an angle relative to the direction in which the lens 10 is moved relative to the print bars 46, or, "adjusting the saber angle," allows a complete coverage of lenses 10 of various shapes and sizes.

The print bars 46 may be arranged linearly next to one another in a direction substantially parallel or perpendicular to the direction in which the lens 10 is moved relative to the print bars 46. The print bars 46 may be offset from one another at a distance from a minimum of 0.001 mm to a maximum of 0.254 mm, preferably from 0.82 mm to 0.127 mm. In other aspects, a distance between the lens 10 and nozzle of each print bar 46 may be from a minimum of 0.1 mm to a maximum of 10 mm, preferably from 1 mm to 3 mm.

During the printing process, the coating material may be applied on the lens 10 in a single pass in which the lens 10 is held stationary and the one or more print bars 46 are moved, or in which the lens 10 is moved and the one or more print bars 46 are held stationary, or in which both the lens 10 and the one or more print bars 46 are moved.

More specifically, the single pass may be performed using a single print bar 46 or multiple print bars 46. The coating material may be applied on the lens 10 in two or more passes in which the lens 10 is held stationary and the one or more print bars 46 are moved, or in which the lens 10 is moved and the one or more print bars 46 are held stationary, or in which both the lens 10 and the one or more print bars 46 are moved. Two or more passes may be performed using a single print bar 46 or multiple print bars 46.

The one or more print bars 46 may be controlled to apply uniform or non-uniform thickness of a coated layer. For example, the one or more print bars 46 may apply a coating having a substantially uniform thickness over an entire printed surface 52 of the lens 10. A thickness of the coated layer on the printed surface may be from a minimum of 0.5 µm to a maximum of 200 µm, preferably 2 µm to 50 µm. A density of droplets of the coating material deposited on the printed surface may between a minimum of 100 droplets-per-inch to a maximum of 1200 droplets-per-inch.

Application quantity may be controlled in various regions of the lens 10 to account for movement of the coating material on a curved surface of the lens 10. For example, on a convex lens 10, the application quantity of the coating material on the radially inner portion of the lens 10 may be higher than an application quantity of the coating material on the radially outer portion of the lens 10 in order to form a coating layer having a uniform thickness. The coating layer may have a non-uniform thickness on various portions of the lens 10.

As previously mentioned, the main computer 110 and/or one or more of the controllers 54 may be configured to automatically adjust the DPI of the coating material to be applied by the various print bars 46 based on lens curvature in order to ensure a uniform coating is applied to the lens.

Referring back to FIG. 3, the printing apparatus 40 may have one or more controllers 54 for controlling the operation of the printing apparatus 40 (see also 54 in FIG. 1). The controller 54 may be configured for controlling the printing operations of the one or more print bars 46 and/or movement operations of the optical lens 10 and/or the one or more print bars 46. In addition, the controller 54 may be configured to control the filling and delivery operations of the coating material in the one or more storage reservoirs 50. For example, the controller 54 may include a variety of discrete computer-readable media components for controlling the printing and/or movement operations.

For example, this computer-readable media may include any media that can be accessed by the controller 54 and/or main computer 110, such as volatile media, non-volatile media, removable media, non-removable media, transitory media, non-transitory media, etc. As a further example, this computer-readable media may include computer storage media, such as media implemented in any method or technology for storage of information, such as computer-readable instructions, data structures, program modules, or other data; random access memory (RAM), read only memory (ROM), electrically erasable programmable read only memory (EEPROM), flash memory, or other memory technology; CD-ROM, digital video disks (DVDs), or other optical disk storage; magnetic cassettes, magnetic tape, magnetic disk storage, or other magnetic storage devices; or any other medium which can be used to store the desired information and which can be accessed by the controller 54. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

With reference to FIG. 1, various aspects of controlling the plurality of print bars 46 may be divided between the one or more controllers 54 and the main computer 110. For example, a user may configure each print bar 46 independently by inputting commands into its corresponding controller 54. The main computer 110 can almost entirely control the printing process and the one or more controllers 54 may merely execute commands from the main computer 110.

With reference to FIGS. 5A-J various iterations of a graphical user interface are provided illustrating a process by which a user may operate a system in accordance with the present invention by inputting commands into the main computer 110. It will be appreciated that the graphical user interface and process steps described in FIGS. 5A-J are merely illustrative and do not limit the scope how the system may be controlled in accordance with the invention.

Figure 5A:
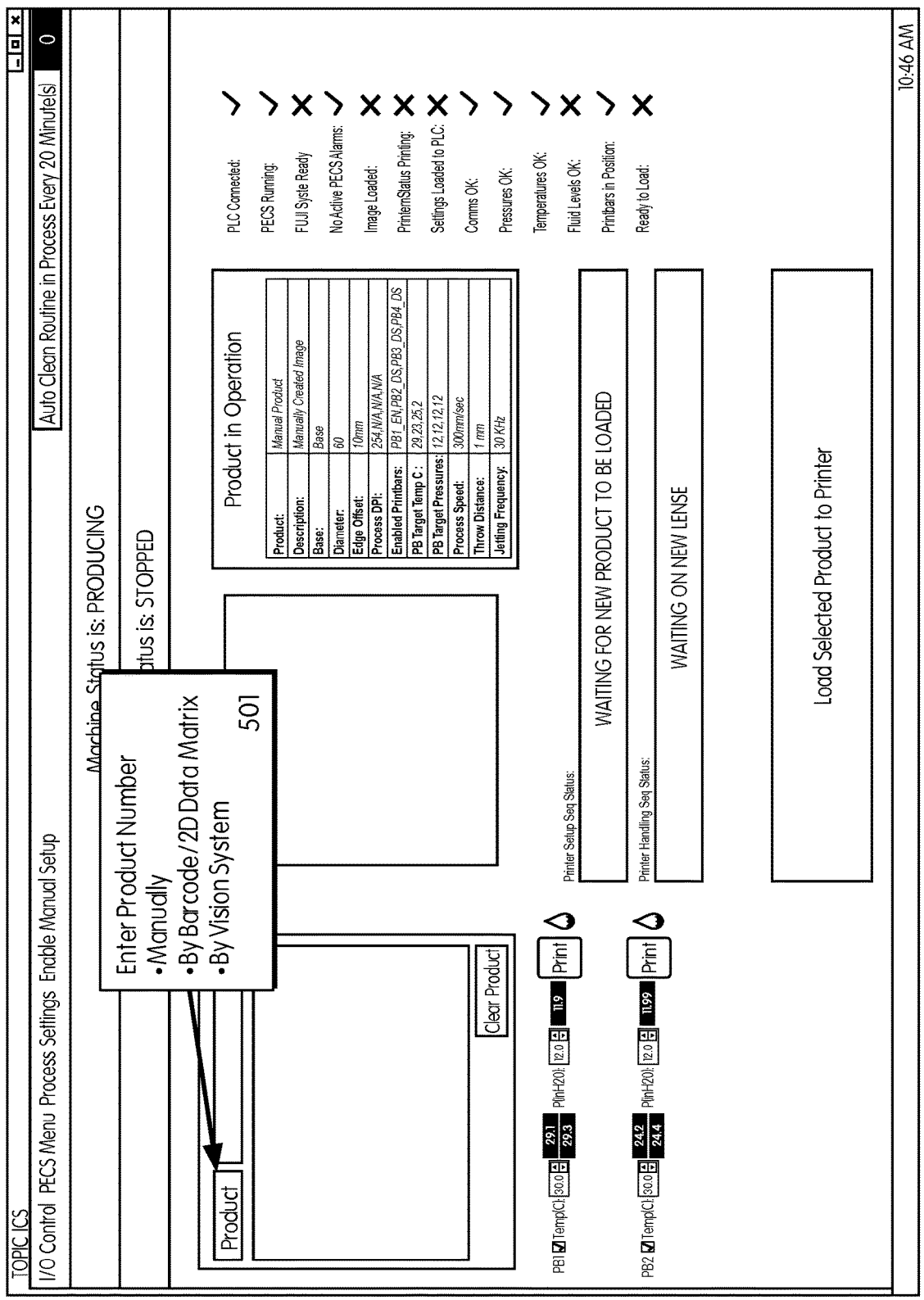
Figure 5B:
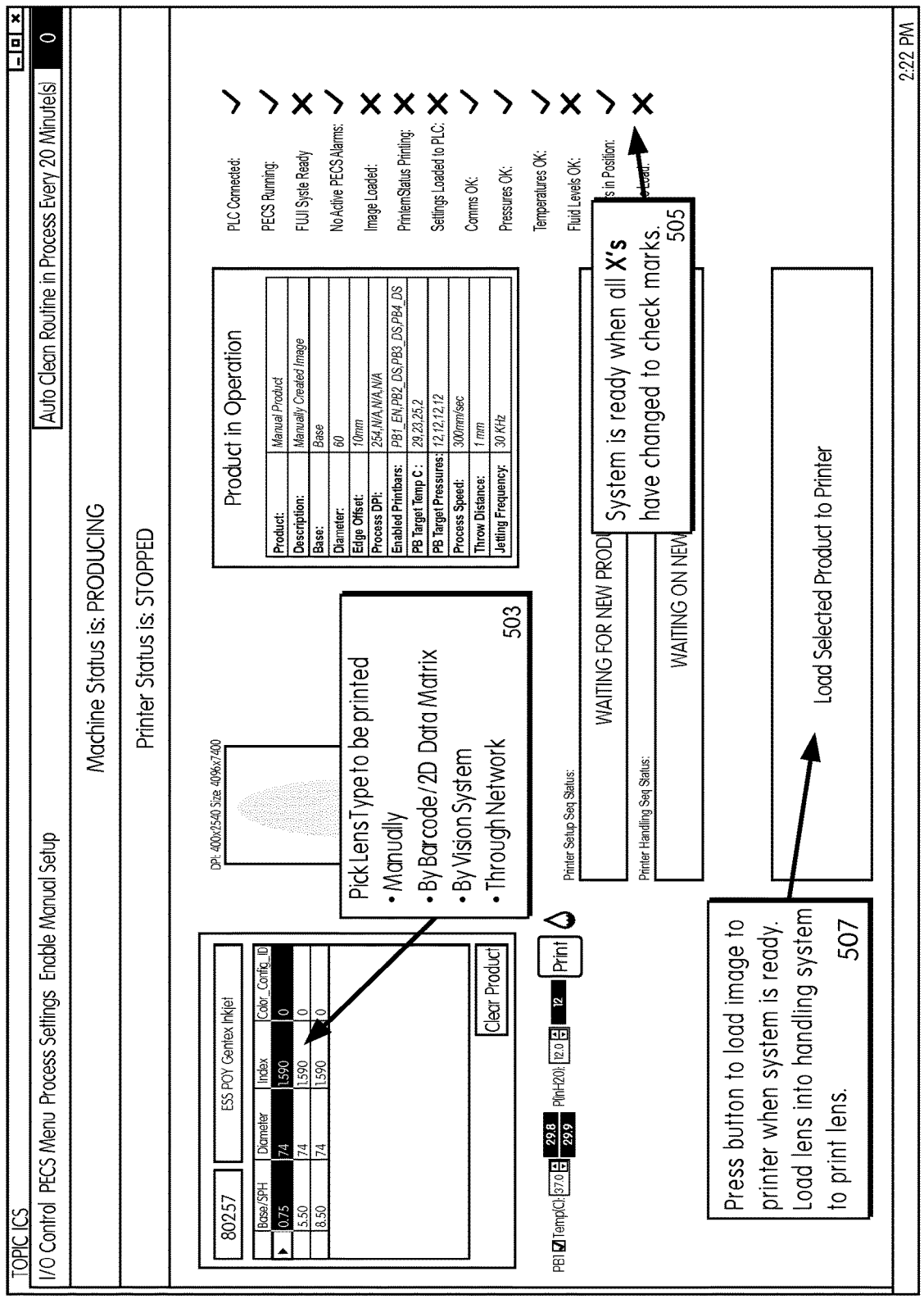

With reference to FIG. 5A, in step 501, a user may provide the main computer 110 with a product number or configure the system to acquire product information via a barcode, 2D Data matrix system and/or visual identification system, as described herein. With reference to FIG. 5B, in step 503, a user may provide more specific data relating to the particular type of lens which is to be printed or, as in step 501, may configure the system to acquire this information via a barcode, 2D Data matrix system and/or visual identification system. In step 505, the system may provide the user with an indication showing whether various printing parameters are within the required tolerance levels and the system is ready to print. In step 507, the user may "press a button" (e.g., by clicking an icon on the graphical user interface) to command the system to load the appropriate image to the printer and to load the movement parameters (e.g., speed and lens height) into the handling system (e.g., a conveyance mechanism, as described herein).

Figure 5C:
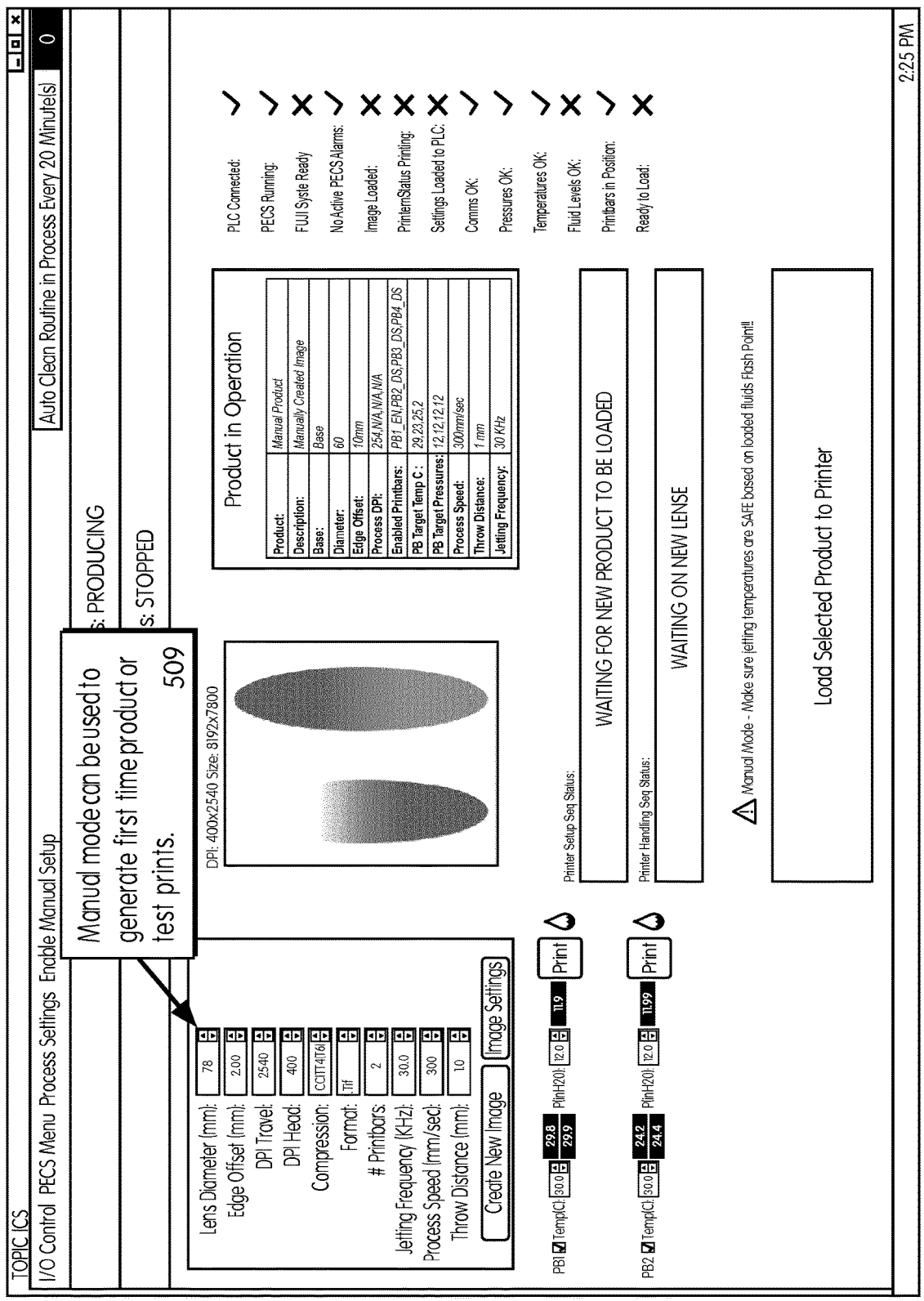
Figure 5D:
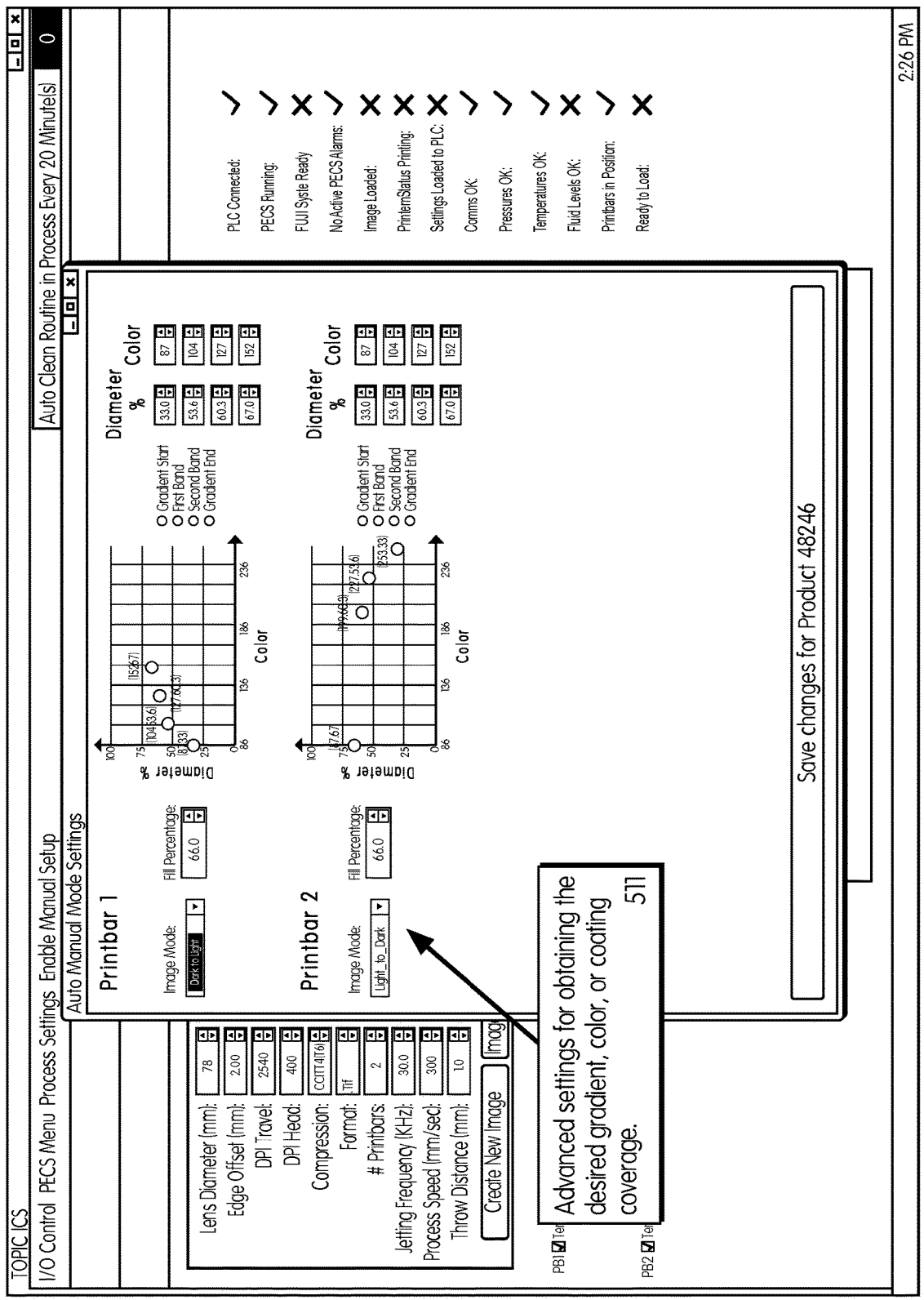
Figure 5E:
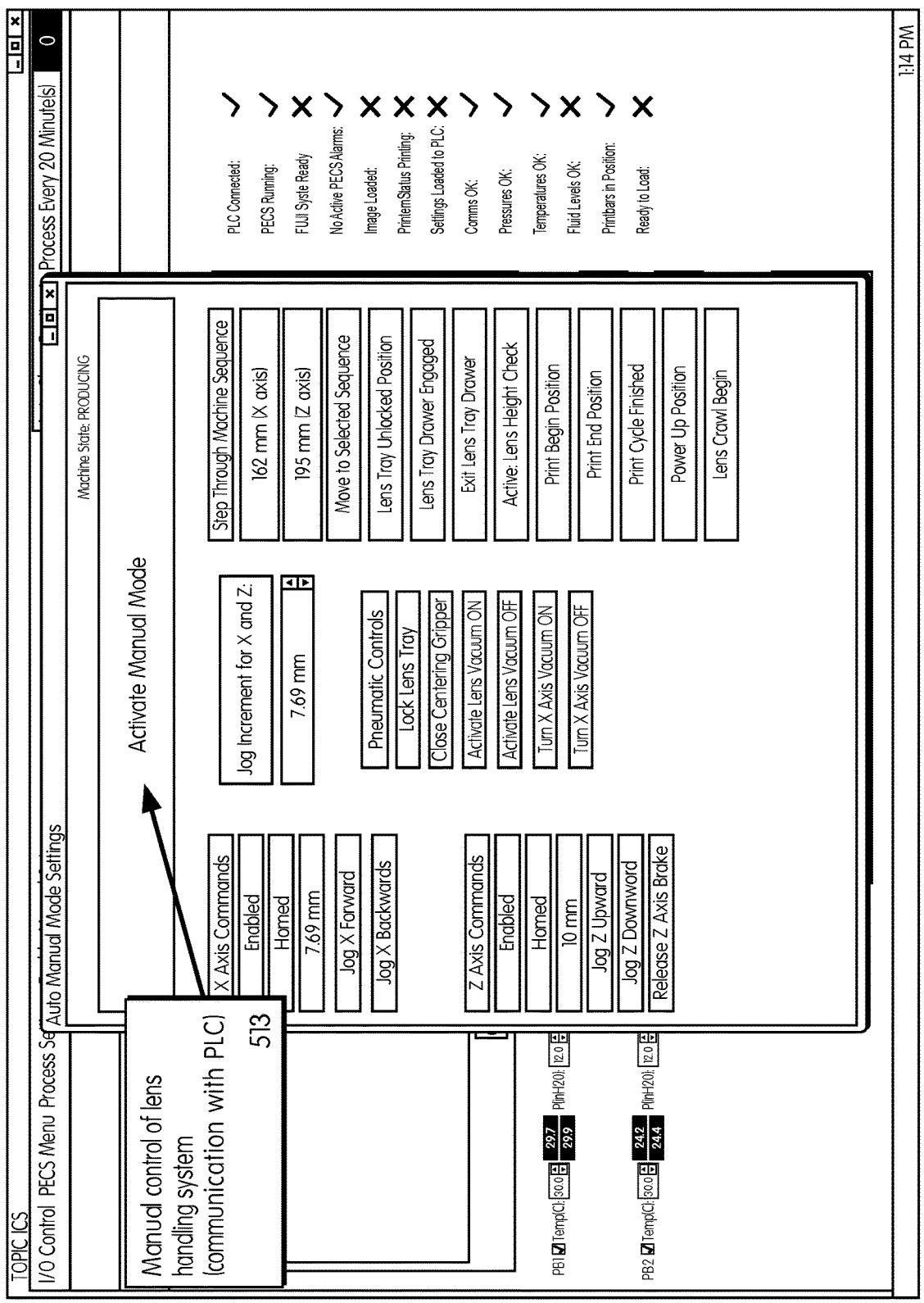

With reference to FIG. 5C, in step 509, in addition or as an alternative to entering a product number or configuring the system to acquire specific product data, a user may optionally utilize a manual mode, for example, to generate first time or test prints, by entering various lens and printing parameters manually. With reference to FIG. 5D, in step 511, a user may manually adjust color, gradient, and/or coating coverage settings for each print bar individually such that a highly customized coating can be produced. With reference to FIG. 5E, in step 513, a user may optionally configure the system to allow for manual control of the lens handling system.

Figure 5F:
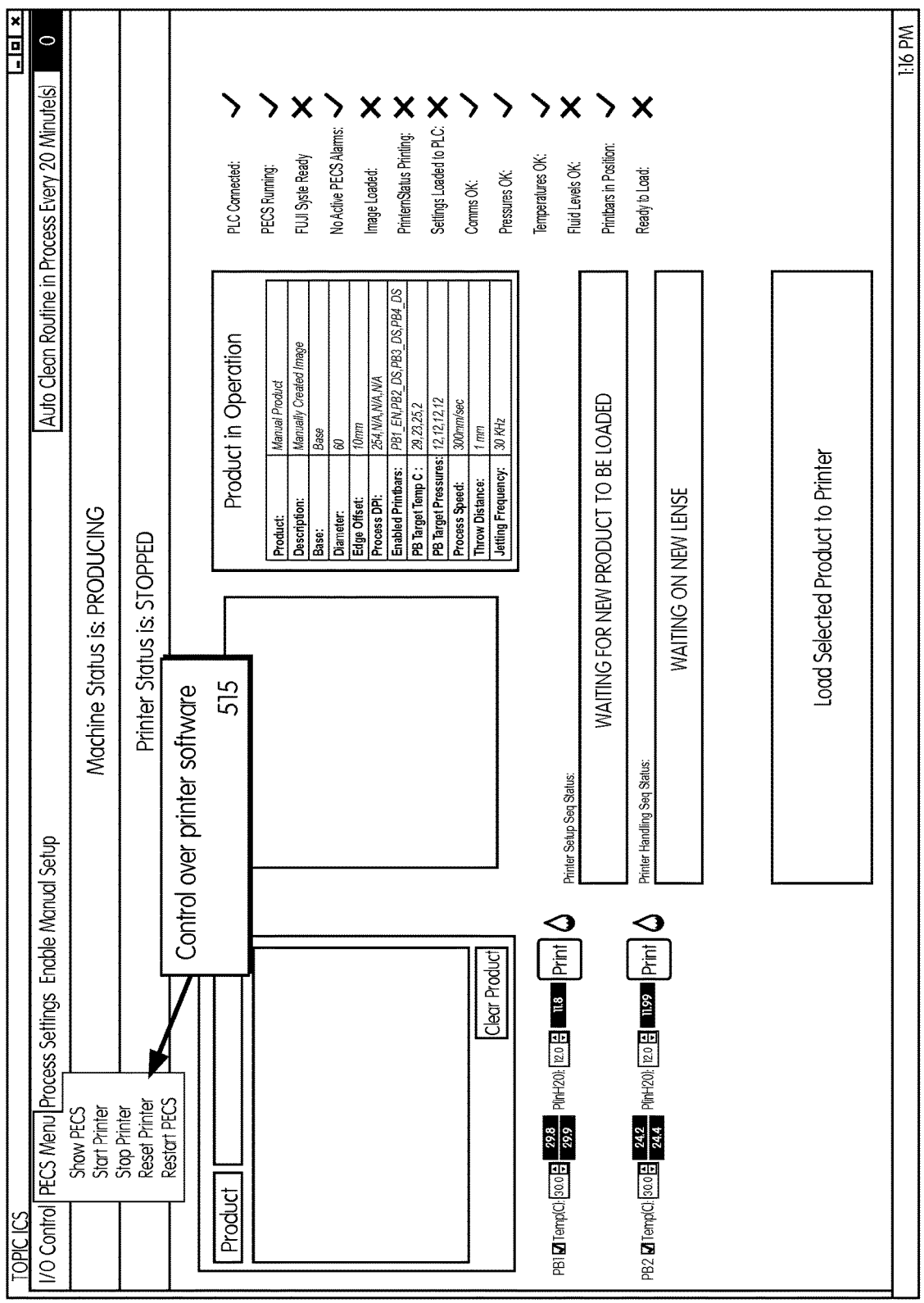
Figure 5G:
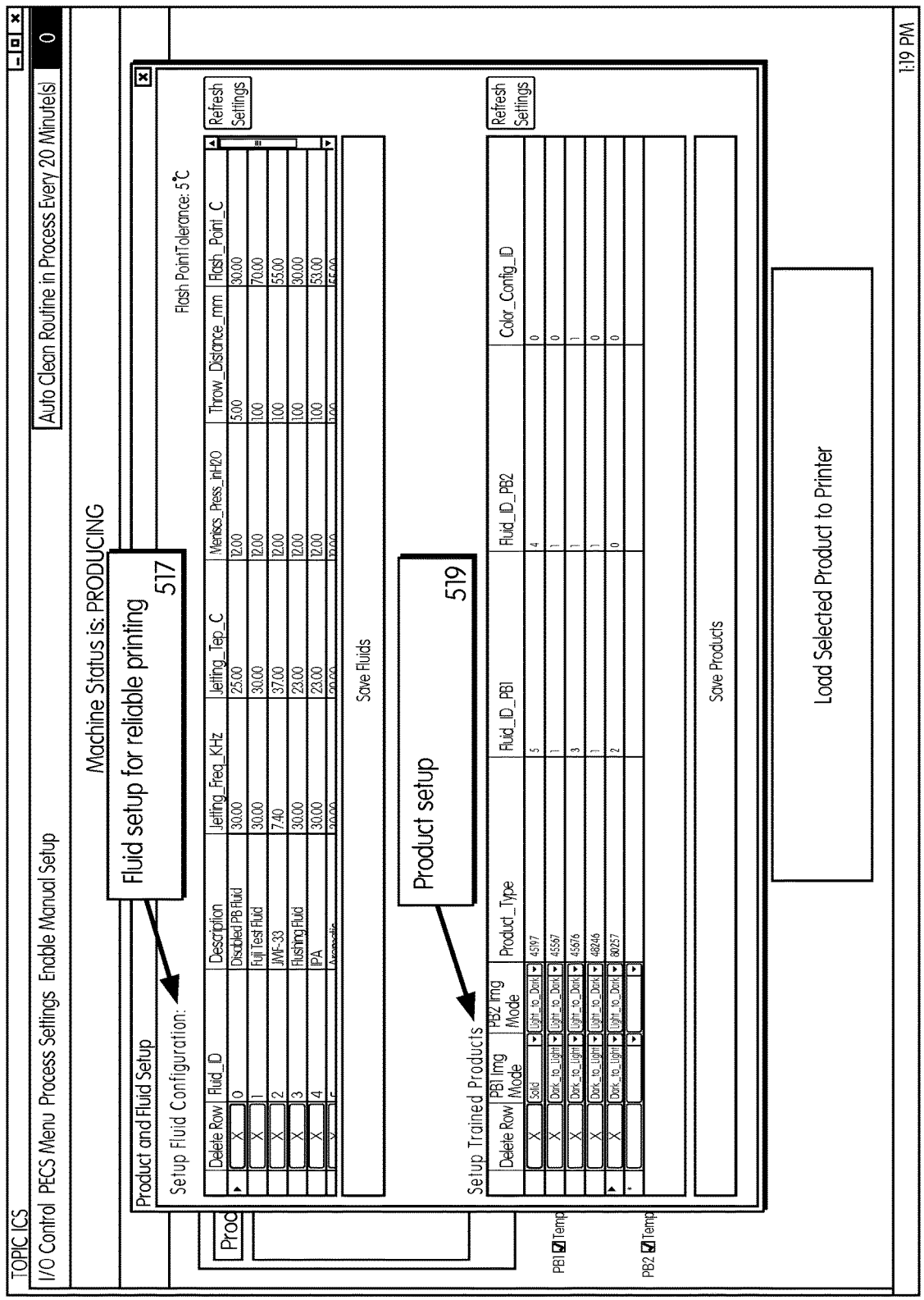

With reference to FIG. 5F, in step 515, a user may select various options to provide control over the printer software. With reference to FIG. 5G, in step 517, a user may select various options for the fluids utilized by each print bar and, in step 519, a user may select various settings to automate the print process for each type of product.

Figure 5H:
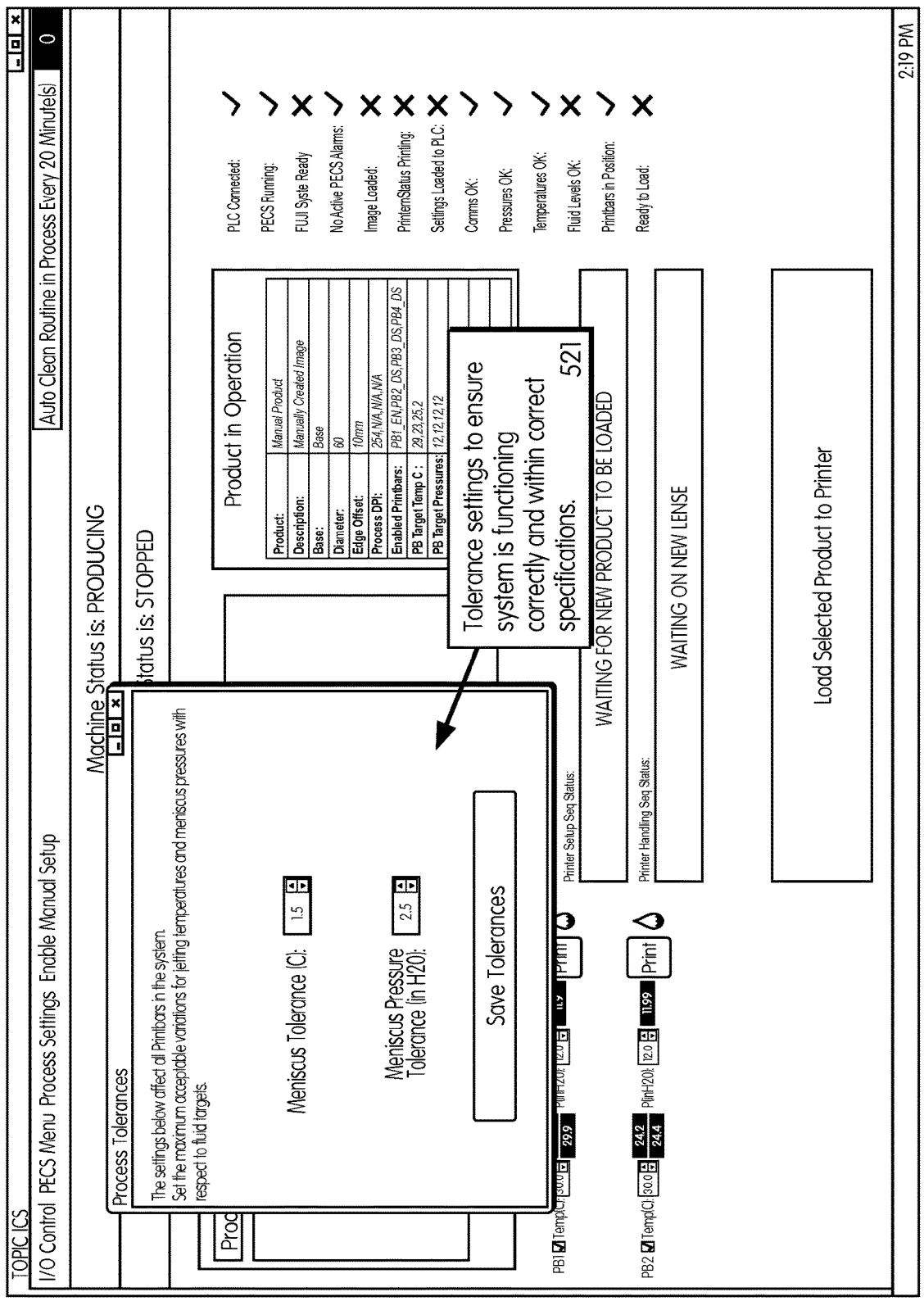

With reference to FIG. 5H, in step 521, a user may set maximum temperature and meniscus pressure variation tolerances for the print bars, depending on the level of precision required for a given application.

Figure 5I:
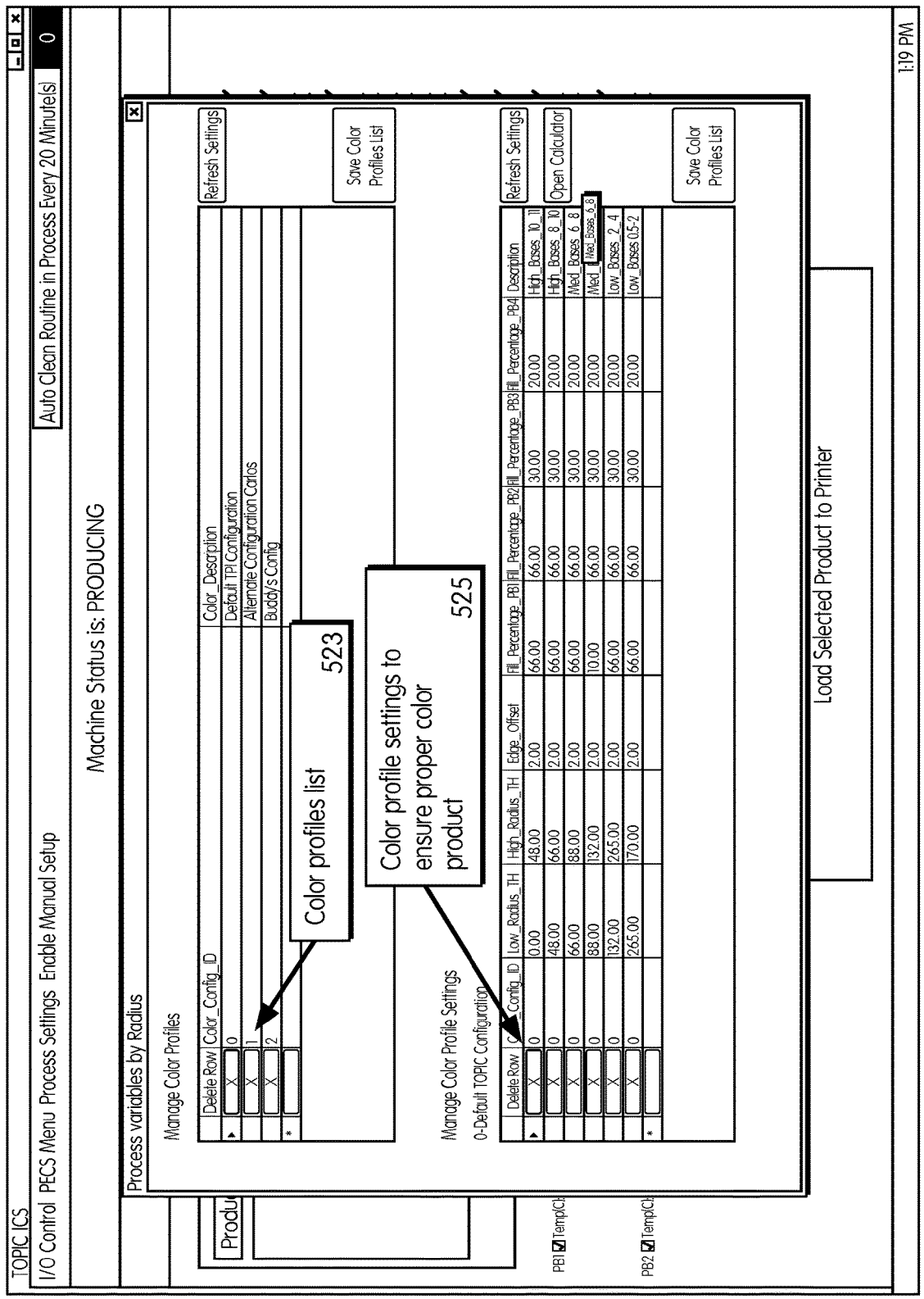

With reference to FIG. 5I, in step 523, various print parameters may be associated with a specified color profile identifier for future use, and in step 525, various color profile settings may be adjusted to ensure a properly colored product is produced.

Figure 5J:
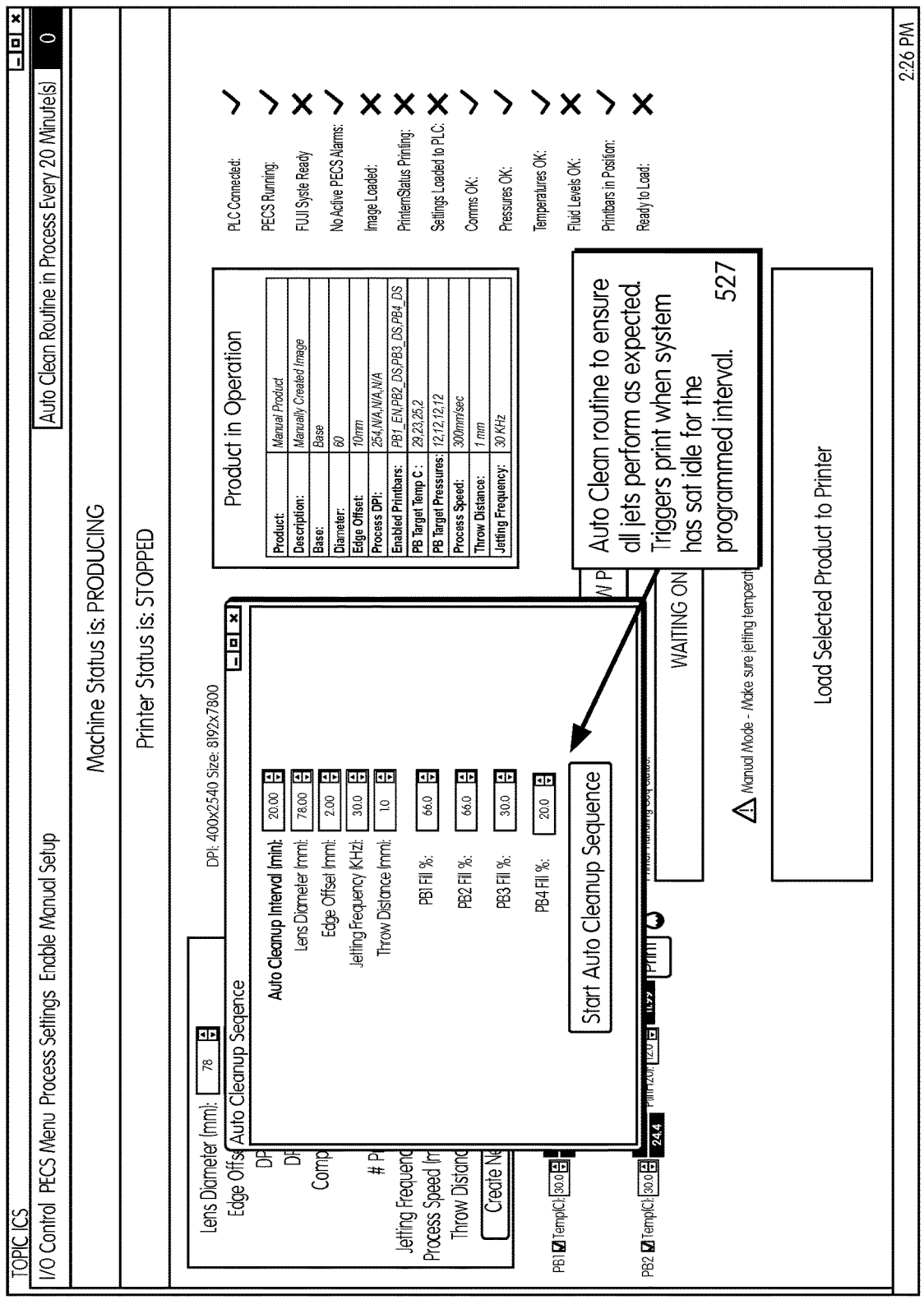

With reference to FIG. 5J, in step 527, a user can set various parameters for an automatic cleaning function, to cause the system to undergo a cleaning mode, for example, after a predetermined period of idleness, in order to ensure proper continued operation of the print jets.

The invention may further be described in the following numbered clauses:

Clause 1. A system for coating a lens 10 using a plurality of inkjet print bars 46, comprising: a plurality of inkjet print bars 46 arranged in-line; at least one processor 54, 110 in communication with the plurality of inkjet print bars 46; a computer-readable medium including program instructions that, when executed by the at least one processor 54, 110, cause the at least one processor 54, 110 to: generate at least one graphical user interface configured to facilitate the automation of the creation or selection of an image to be printed on a lens 10; generate a plurality of image layers based on the lens geometry, target product, and number of print bars 46; and control at least two inkjet print bars 46 of the plurality of inkjet print bars 46 to print the image on the lens 10, such that each of the at least two inkjet print bars 46 prints at least one image layer of the plurality of image layers.

Clause 2. The system of clause 1, wherein the program instructions, when executed by the at least one processor 54, 110, further cause the at least one processor 54, 110 to configure the at least two inkjet print bars 46 in the system based on product data for the lens 10.

Clause 3. The system of clause 2, wherein configuring the at least two inkjet print bars 46 comprises at least one of the following: setting a jetting temperature of at least one inkjet print bar 46 based on the product data, setting a pressure or pressure target of at least one inkjet print bar 46 based on the product data, setting a throw distance of at least one inkjet print bar 46 based on the product data, setting a jetting frequency of at least one inkjet print bar 46 based on the product data, setting a print bar DPI of at least one inkjet print bar 46 based on the product data, or any combination thereof.

Clause 4. The system of any of clauses 1 to 3, wherein the program instructions, when executed by the at least one processor 54, 110, further cause the at least one processor 54, 110 to automatically modify the image based on product data for the lens 10.

Clause 5. The system of any of clauses 2 to 4, wherein the product data comprises at least one of lens diameter and lens curvature.

Clause 6. The system of any of clauses 1 to 5, wherein the at least one processor 54, 110 controls the at least two inkjet print bars 46 by: controlling a first inkjet print bar 46 of the plurality of inkjet print bars 46 to print at least one first image layer of the plurality of image layers on the lens 10 based on the lens product data; automatically moving the lens 10 from the first inkjet print bar 46 to a second inkjet print bar 46 of the plurality of inkjet print bars 46; and controlling the second inkjet print bar 46 to print at least one second image layer of the plurality of image layers on the lens 10 based on the lens product data.

Clause 7. The system of any of clauses 1 to 6, further comprising a lens conveyance mechanism 42 in communication with the at least one processor 54, 110, wherein the program instructions, when executed by the at least one processor 54, 110, further cause the at least one processor 54, 110 to control the lens conveyance mechanism 42 to move the lens 10 between each inkjet print bar 46 of the at least two inkjet print bars 46.

Clause 8. The system of any of clauses 1 to 7, wherein each inkjet print bar 46 of the plurality of inkjet print bars 46 prints at least a portion of at least one image layer of the plurality of image layers.

Clause 9. The system of any of clauses 1 to 8, wherein the at least one graphical user interface is further configured to facilitate the automation of image creation based on parameters specified by either existing product data, or a specific set of parameters entered by the user 112.

Clause 10. The system of any of clauses 1 to 9, wherein the at least one processor 54, 110 controls the at least two inkjet print bars of the plurality of inkjet print bars 46 by controlling at least one print head of a first inkjet print bar 46 and at least one print head of a second inkjet print bar.

Clause 11. The system of any of clauses 1 to 10, wherein the program instructions, when executed by the at least one processor 54, 110, further cause the at least one processor 54, 110 to rasterize the image.

Clause 12. The system of any of clauses 1 to 10, wherein the program instructions, when executed by the at least one processor 54, 110, further cause the at least one processor 54, 110 to rasterize each image layer of the plurality of image layers.

Clause 13. The system of any of clauses 1 to 12, wherein the at least one graphical user interface is further configured to facilitate user 112 selection of the lens 10 from a plurality of lenses.

Clause 14. The system of any of clauses 1 to 13, wherein the program instructions, when executed by the at least one processor 54, 110, further cause the at least one processor 54, 110 to automatically create the image based on product data for the lens 10.

Clause 15. The system of clause 14, wherein the image is automatically created based at least partially on an index of refraction, curvature, and/or diameter of the lens 10.

Clause 16. A method for coating a lens 10 using a plurality of ink-jet print bars 46 arranged in-line over a lens 10 conveyance mechanism 42, the method comprising: generating, using at least one processor 54, 110, at least one graphical user interface configured to facilitate the automation of the creation or selection of an image to be printed on a lens 10; determining, using the at least one processor 54, 110, product data for a lens 10; generating or selecting, based at least partially on the product data, an image to be printed on the lens 10, the image comprising a plurality of image layers; configuring at least two of the plurality of inkjet print bars 46 based on the product data and the image to be printed, conveying, the lens 10, using the lens 10 conveyance mechanism 42, between each of the at least two inkjet print bars 46; and controlling, using the at least one processor 54, 110, each of the at least two inkjet print bars 46, such that each print bar 46 prints at least one of the plurality of image layers on the lens 10.

Clause 17. The method according to clause 16, wherein the product data wherein the product data comprises at least one of lens diameter and lens curvature; wherein the concentration of a coating material printed by at least one of the plurality of inkjet print bars 46 is varied based at least partially on the lens diameter and/or lens curvature.

Clause 18. The method according to any of clauses 16-17, wherein the product data is determined based at least partially on a product code associated with a desired end-product, wherein the product code is inputted by a user 112, downloaded from a network 116 or database 118, or any combination thereof.

Clause 19. The method according to any of clauses 16-18, wherein the product data is determined based at least partially on data received from at least one camera 124 in communication with the at least one processor 54, 110.

Clause 20. The method according to clause 19, wherein, the at least one processor (54, 110) is configured or programmed to identify, based on the data received from the at least one camera 124, at least one distinguishing feature of the lens 10, wherein the distinguishing feature is associated with a desired end-product, and wherein at least one of the plurality of inkjet print bars 46 is further configured based on the desired end-product.

Clause 21. The method according to clause 20, wherein the distinguishing feature comprises at least one of an identifying mark associated with a particular end product, a characteristic measurement associated with one or more possible end products, or any combination thereof.

Clause 22. The method according to any of clauses 19-22, wherein the at least one processor 54, 110 is further configured to programed to, based on data received from the at least one camera 124, measure at least one of lens diameter, radius of curvature, and index of refraction, and to automatically configure at least two of the plurality of inkjet print bars 46 based at least partially on the measured lens diameter, radius of curvature, and/or index of refraction.

Although the invention has been described in detail for the purpose of illustration based on what is currently considered to be the most practical and preferred configurations, it is to be understood that such detail is solely for that purpose and that the invention is not limited to the disclosed configurations, but, to the contrary, is intended to cover modifications and equivalent arrangements that are within the spirit and scope of the appended claims. For example, it is to be understood that the present invention contemplates that, to the extent possible, one or more features of any configuration can be combined with one or more features of any other configuration.

The invention claimed is:

1. A system for coating a lens using a plurality of inkjet print bars, comprising:
    a plurality of inkjet print bars;
    at least one processor in communication with the plurality of inkjet print bars;
    a lens conveyance mechanism in communication with the at least one processor, wherein the plurality of inkjet print bars are arranged in-line along the lens conveyance mechanism, such that the plurality of inkjet print bars is configured to print on the lens in sequence as the lens is moved along the lens conveyance mechanism; and
    a computer-readable medium including program instructions that, when executed by the at least one processor, cause the at least one processor to:
        generate at least one graphical user interface configured to facilitate the automation of the creation or selection of an image to be printed on the lens;
        generate a plurality of image layers based on the lens geometry, target product, and number of print bars;
        control the lens conveyance mechanism to move the lens between at least two inkjet print bars of the plurality of inkjet print bars for printing of the plurality of image layers; and
        control the at least two inkjet print bars to print the image on the lens, such that each of the at least two inkjet print bars prints at least one image layer of the plurality of image layers.

2. The system of claim 1, wherein the program instructions, when executed by the at least one processor, further cause the at least one processor to configure the at least two inkjet print bars in the system based on product data for the lens,
    wherein configuring the at least two inkjet print bars comprises at least one of the following: setting a jetting temperature of at least one inkjet print bar based on the product data, setting a pressure or pressure target of at least one inkjet print bar based on the product data, setting a throw distance of at least one inkjet print bar based on the product data, setting a jetting frequency of at least one inkjet print bar based on the product data, setting a print bar DPI of at least one inkjet print bar based on the product data, or any combination thereof.

3. The system of claim 1, wherein the program instructions, when executed by the at least one processor, further cause the at least one processor to automatically modify the image based on product data for the lens,
    wherein the product data comprises at least one of lens diameter and lens curvature.

4. The system of claim 1, wherein the at least one processor controls the at least two inkjet print bars by:
    controlling a first inkjet print bar of the plurality of inkjet print bars to print at least one first image layer of the plurality of image layers on the lens based on the lens product data;
    automatically moving the lens from the first inkjet print bar to a second inkjet print bar of the plurality of inkjet print bars; and
    controlling the second inkjet print bar to print at least one second image layer of the plurality of image layers on the lens based on the lens product data.

5. The system of claim 1, wherein each inkjet print bar of the plurality of inkjet print bars prints at least a portion of at least one image layer of the plurality of image layers.

6. The system of claim 1, wherein the at least one graphical user interface is further configured to facilitate the automation of image creation based on parameters specified by existing lens product data, a specific set of parameters entered by the user, visual data regarding the lens collected by a camera in communication with the at least one processor, or any combination thereof.

7. The system of claim 1, wherein the program instructions, when executed by the at least one processor, further cause the at least one processor to rasterize the image and/or each image layer of the plurality of image layers.

8. The system of claim 1, wherein the at least one graphical user interface is further configured to facilitate user selection of the lens from a plurality of lenses,
    wherein the program instructions, when executed by the at least one processor, further cause the at least one processor to automatically create the image based on product data for the lens, and
    wherein the image is automatically created based at least partially on an index of refraction, lens curvature, and a diameter of the lens.

9. A method for coating a lens using a plurality of inkjet print bars arranged in-line, comprising:
    generating, using at least one processor in communication with the plurality of inkjet print bars, at least one graphical user interface configured to facilitate the automation of the creation or selection of an image to be printed on a lens;
    generating, using the at least one processor, a plurality of image layers based on the lens geometry, target product, and number of print bars;
    controlling, using the at least one processor, a lens conveyance mechanism to move the lens between at least two inkjet print bars of the plurality of inkjet print bars for printing of the plurality of image layers, wherein the plurality of inkjet print bars are arranged in-line along the lens conveyance mechanism, such that the plurality of inkjet print bars is configured to print on the lens in sequence as the lens is moved along the lens conveyance mechanism; and
    controlling, using the at least one processor, the at least two of the plurality of inkjet print bars to print the image on the lens, such that each of the at least two inkjet print bars prints at least one image layer of the plurality of image layers.

10. The method according to claim 9, further comprising configuring, using the at least one processor, at least two inkjet print bars in the system based on product data for the lens,
    wherein configuring the at least two inkjet print bars comprises at least one of the following: setting a jetting temperature of at least one inkjet print bar based on the product data, setting a pressure or pressure target of at least one inkjet print bar based on the product data, setting a throw distance of at least one inkjet print bar based on the product data, setting a jetting frequency of at least one inkjet print bar based on the product data, setting a print bar DPI of at least one inkjet print bar based on the product data, or any combination thereof.

11. The method according to claim 9, further comprising:
automatically modifying, using the at least one processor, the image based on product data for the lens,
wherein the lens product data comprises at least one of lens diameter and lens curvature.

12. The method according to claim 9, further comprising:
controlling a first inkjet print bar of the plurality of inkjet print bars to print at least one first image layer of the plurality of image layers on the lens based on the lens product data;
automatically moving the lens from the first inkjet print bar to a second inkjet print bar of the plurality of inkjet print bars; and
controlling the second inkjet print bar to print at least one second image layer of the plurality of image layers on the lens based on the lens product data.

13. The method of claim 9, wherein each inkjet print bar of the plurality of inkjet print bars prints at least a portion of at least one image layer of the plurality of image layers.

14. The method of claim 9, wherein the at least one graphical user interface is further configured to facilitate the automation of image creation based on parameters specified by existing product lens data, a specific set of parameters entered by the user, visual data regarding the lens collected by a camera in communication with the at least one processor, or any combination thereof, and
wherein the program instructions, when executed by the at least one processor, further cause the at least one processor to rasterize the image and/or each image layer of the plurality of image layers.

15. The method of claim 9, wherein the at least one graphical user interface is further configured to facilitate user selection of the lens from a plurality of lenses,
wherein the program instructions, when executed by the at least one processor, further cause the at least one processor to automatically create the image based on product data for the lens, and
wherein the image is automatically created based at least partially on an index of refraction, curvature, and/or diameter of the lens.

* * * * *